Figure 3:
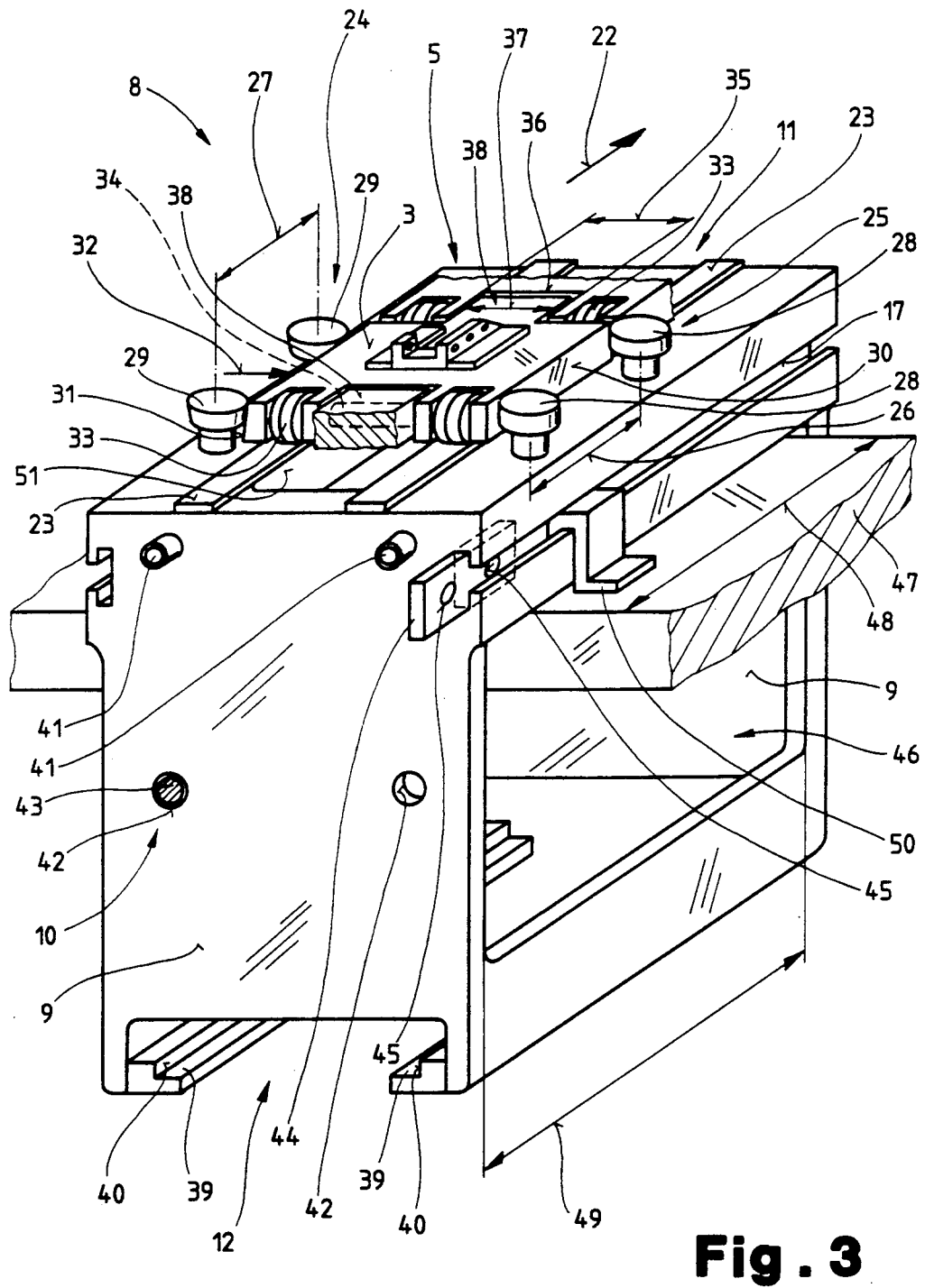

United States Patent [19]

Sticht

[11] Patent Number: 5,125,140
[45] Date of Patent: Jun. 30, 1992

[54] ARRANGEMENT FOR MACHINING AND/OR ASSEMBLING COMPONENTS

[76] Inventor: Walter Sticht, Karl-Heinrich-Waggerl-Strasse 8, A-4800 Attnang-Puchheim, Austria

[21] Appl. No.: 474,816

[22] PCT Filed: Jan. 5, 1989

[86] PCT No.: PCT/AT89/00002
§ 371 Date: Aug. 17, 1990
§ 102(e) Date: Aug. 17, 1990

[87] PCT Pub. No.: WO89/06177
PCT Pub. Date: Jul. 13, 1989

[30] Foreign Application Priority Data

Jan. 7, 1988 [AT] Austria ............................ 20/88

[51] Int. Cl.⁵ ............................ B23P 7/03; B65G 21/20
[52] U.S. Cl. .................................... 29/33 P; 198/860.2
[58] Field of Search ........................ 29/33 P, 563; 198/860.2, 860.3, 860.1, 861.1

[56] References Cited

U.S. PATENT DOCUMENTS

| 3,596,752 | 8/1971 | Garvey | 198/860.3 |
| 3,605,994 | 9/1971 | Parlette | 198/861.1 |
| 4,511,031 | 4/1985 | Lachonius | 198/860.2 X |
| 4,881,633 | 11/1989 | Cailey et al. | 198/860.2 |
| 4,951,809 | 8/1990 | Bootite | 198/861.1 X |

Primary Examiner—William Briggs
Attorney, Agent, or Firm—Collard & Roe

[57] ABSTRACT

An arrangement comprises several work stations for machining and/or assembling components. Receivers for holding components are provided on workpiece holders (3) connected to a feed drive in the form of a conveyor chain (5). Guide devices with guide tracks (11, 12) for the conveyor chain are arranged in identical housing parts (8). The guide tracks (11, 12) are of equal length. The housing parts (8) are connected to one another and to a reversing station (7) for the conveyor chain (5) by means of guide and/or coupling devices (10) to form a housing unit supported on a contact surface (14) by supporting devices (13).

21 Claims, 5 Drawing Sheets

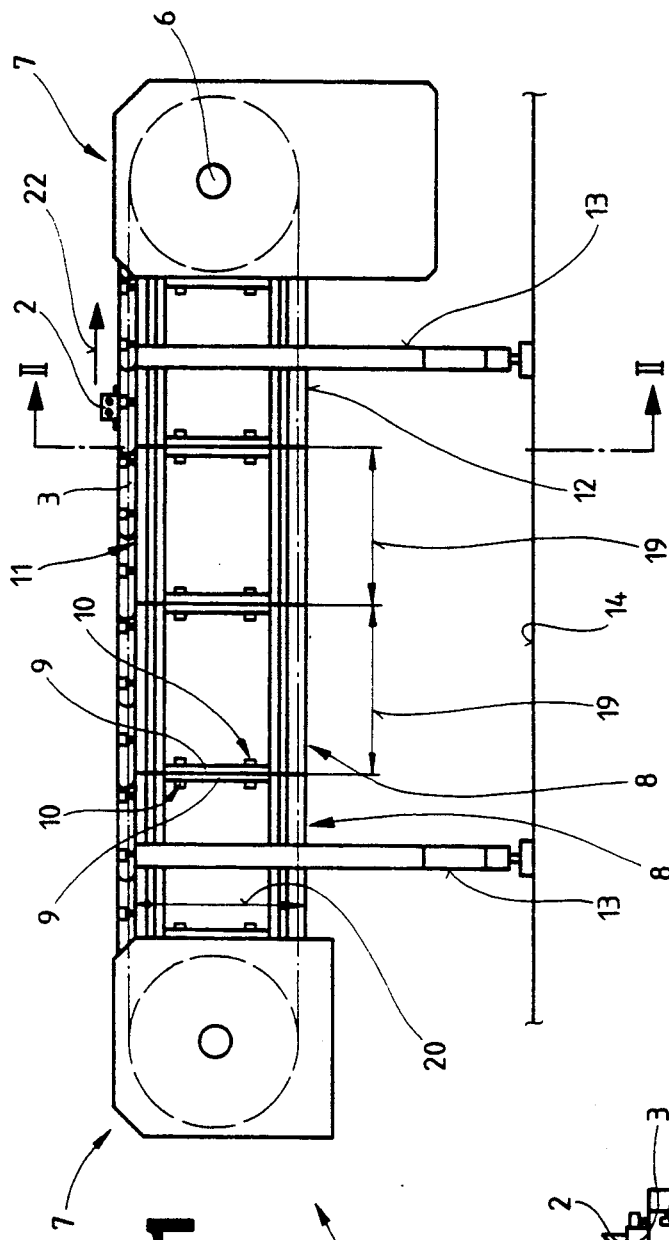
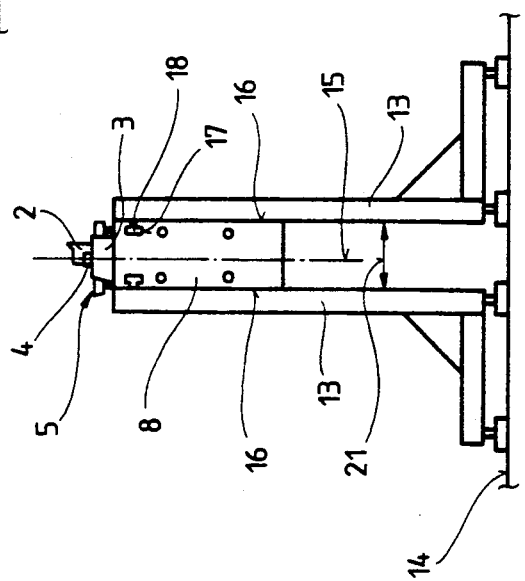

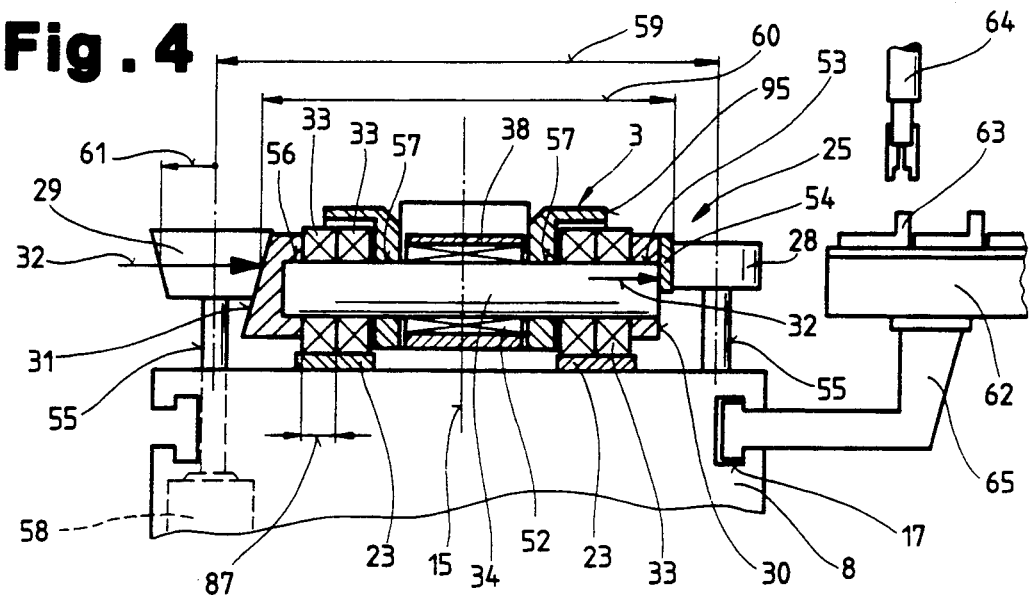
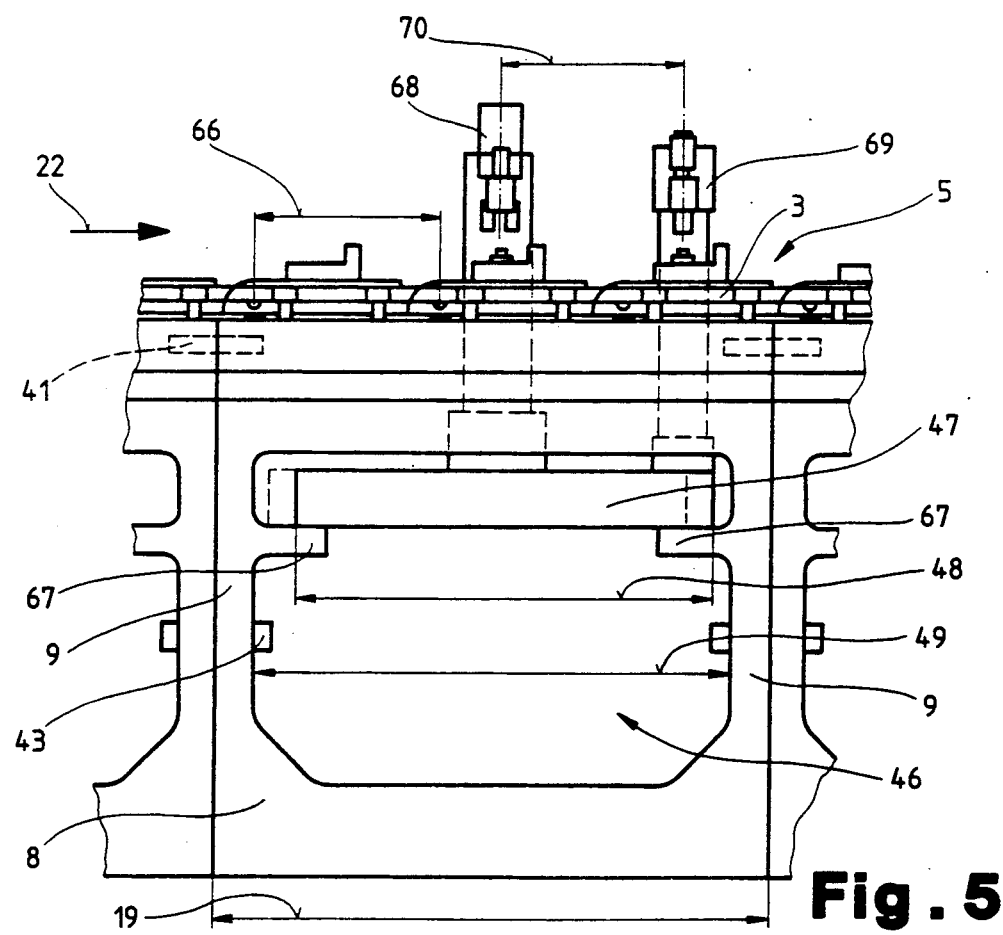

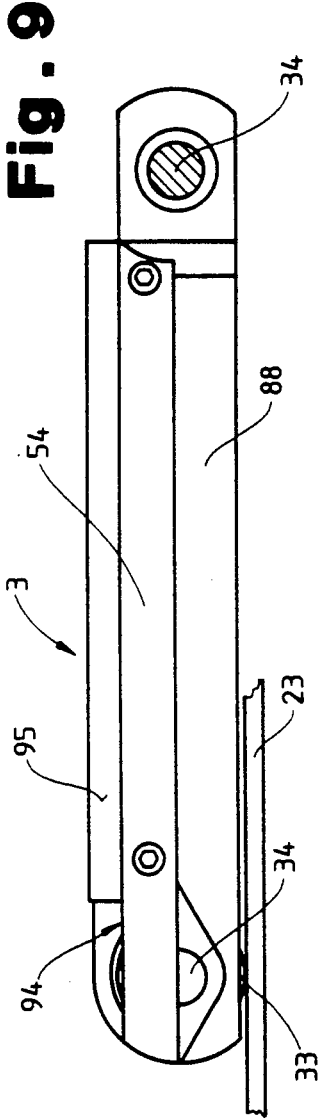
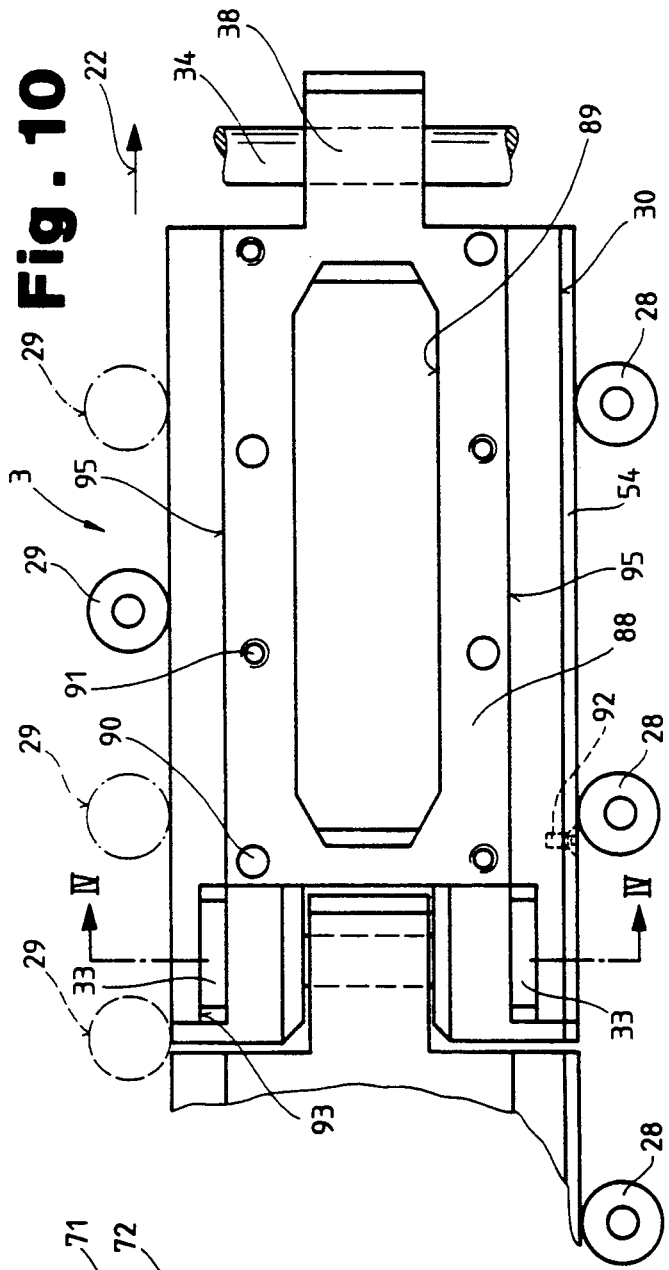
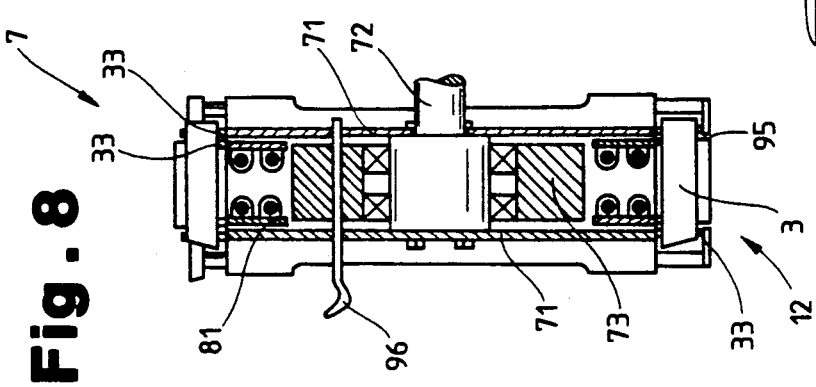

ARRANGEMENT FOR MACHINING AND/OR ASSEMBLING COMPONENTS

The invention relates to an installation for processing and/or assembling components, having workpiece carriers, which are provided with receptacles for holding components, and, connected thereto, a chain conveyor as a feed drive and having a guidance device disposed in housing parts with guideways for the chain conveyor.

In installations of this type, a basic distinction can be made between so-called loosely concatenated and rigidly concatenated installations. In loosely concatenated installations, the workpiece carriers are moved along the installation completely independently of one another and, in the event that a device in a single workstation breaks down, for a specific period of time this has virtually no effect on the activity of the other workstations. In rigidly concatenated installations, the workpiece carriers are interconnected in their movement so that, if faults arise in the vicinity of one workstation, all the workpiece carriers and all the workstations are blocked. Each of the two types of installation has its own range of application, the rigidly concatenated installations being used where only a few workstations are concatenated since the total utilisation rate is a product of the utilisation rates of the individual workstations. Loosely concatenated installations are generally used to concatenate a plurality of workstations, e.g. up to 40 or more, since in this case the utilisation rate is then a value compounded from the individual occurrences of faults rather than the product of the utilisation rates in the individual stations.

Many different installations with loose concatenation are already known—e.g. from DE-OS 35 02 868, DE-OS 35 02 820, DE-OS 34 11 452, DE-OS 33 04 091 and DE-PS 27 56 422 of the same applicant—which have proved successful in practice for concatenating a plurality of workstations. The workpiece carriers are in each case conveyed along lateral and vertical guideways independently of one another, and appropriate use of conveying rollers pressed against the side surfaces of the workpiece carriers ensures lateral and vertical guidance of the workpiece carriers without any play. Thus, accurate positioning of the workpiece carriers is achieved throughout the entire course of such an installation in cooperation with the drive means.

Rigidly concatenated installations are also known— from DE-OS 26 40 593—in which the individual workpiece carriers are connected by chain conveyors. Up till now, it has been difficult to series-produce such installations or to make them adaptable to varying requirements with a varying number of workstations. It was moreover difficult to install the chain on the assembly or processing devices disposed in the workstations. The further known rigidly concatenated installations for processing and assembling components are formed by rotary tables which may possibly also be concatenated by way of additional conveying devices—e.g. according to DE-OS 31 34 195. Such rigidly concatenated installations, which may be formed by rotary tables, cannot subsequently be extended by adding extra workstations and take up a great deal of room, especially when a plurality of workstations are arranged in tandem. Furthermore, access, assembly and maintenance are made very difficult by the compact arrangement of the assembly and handling devices or processing devices disposed inside the rotary table.

The aim of the present invention is to provide an installation for processing and/or assembling components which is of a simple and well-arranged construction, can easily be adapted to a varying number of workstations and can subsequently be extended at any time. Furthermore, there should be precision guidance of the workpiece carriers in such a rigidly concatenated installation.

The aim of the invention is achieved in that the housing parts are of identical construction and preferably one length of the guideway of said parts is of an identical size, and in that the housing parts are connected to one another and to a chain-guiding station for the chain conveyor by way of guidance and coupling devices to form a housing unit, said devices being supported by means of support devices on a support surface. The advantageous effect achieved by this seemingly surprising simple combination of features is that even a rigidly concatenated system of relatively simple construction may quickly be adapted to differing requirements since it may be adapted for any number of workstations by adding further housing parts. Furthermore, since the housing parts are identical in construction, the installation may also have additional housing parts added on at any later stage. It is moreover also possible to series produce the individual components of such an installation on a commercial basis, with the result that they may be interchanged at random and can be produced inexpensively. This allows such installations to be used also in fields where up till now automated assembly and processing of workpieces has seemed impossible owing to the high cost of such an installation.

According to a further embodiment, it is provided that the housing parts are of identical dimensions, thereby permitting the housing parts to be interchanged at random.

It is however also advantageous if the housing parts between the chain-guiding stations are disposed in a self-supporting manner as this allows the weight and the outlay for manufacturing such an installation to be additionally reduced.

It is also possible for a continuous fastening device, e.g. an assembly rail, by means of which the support devices and supply devices and other means cooperating with the workpiece carriers may easily be positioned, to be disposed on the housing parts along the guideway.

It is, however, also possible for the housing part, which is in particular constructed as a single piece, to be of a cantilever design and to carry two parallel-running guideways for a drawn and a return course of the chain of the chain conveyor. It is thereby possible to find installations with only one housing part for guidance of the chain conveyor.

According to another design variation, it is provided that the guideways are interconnected by way of end plates which carry the guidance and coupling devices, thereby achieving a compact, torsion-proof component as a housing part which without additional measures also has cantilever properties.

A further alternative, however, is for the guideway on the housing part to comprise guide rails extending parallel to an upper side of said guideway for vertically guiding workpiece carriers forming the chain links of the chain conveyor. This makes it possible to achieve exact and precise guidance of the workpiece carriers in the individual work areas independently of any sagging or swinging of the chain conveyor. By using individual guide rails, a high degree of guiding precision may be achieved independently of the material of the housing part.

It is however also advantageous if the guidance device comprises a lateral guideway for the chain links or workpiece carriers of the chain conveyor, said lateral guideway extending parallel to the guideway disposed on the upper side of the housing part, as this allows the individual chain links to be guided and positioned precisely relative to the housing part completely independently of their hinged interconnection. Thus, the chain links may be used directly as workpiece carriers and it is possible to dispense with an additional centering of the individual workpiece carriers in the workstations.

Furthermore, it is also possible for the lateral guideway to be formed by support rollers which are arranged spaced apart from one another along the guideway and are supported on axes extending approximately at right angles to the upper side of the housing parts, this allowing the guidance precision to be maintained even over an extended operating period.

According to another variation, it is provided that the support rollers are disposed on either side of the chain conveyor, thereby achieving central guidance of the chain links.

A construction is also advantageous wherein the support rollers are associated with one longitudinal side of the chain conveyor and a pressure device for exerting a pressure force directed towards the support rollers—arrow 32—is associated with the opposite longitudinal side. This achieves precise guidance along a lateral guideway lying opposite the pressure device independently of the precision of the guide surfaces or the arrangement of the support rollers. What is more, the pressure device additionally damps the running of the chain conveyor as a result of restraint and prevents the chain conveyor from jumping or knocking as it moves forward from one workstation to another.

According to another embodiment, it is provided that a table board for accommodating handling and/or processing devices is supported so as to be movable relative to the housing parts, this achieving in a surprisingly simple manner the effect that, after tensioning of the chain conveyor, the assembly and/or processing devices disposed on the table boards may be adjusted to the position of the workpiece carriers or chain links. Thus, the amount of work required to align the assembly and/or processing devices in the individual workstations is advantageously reduced and also, when regulating the tension of the chain, the amount of work required and hence maintenance costs are also low.

It is moreover also possible for a clearance to be disposed between the guideways and the end plates, thereby achieving a profile-like construction for the housing part and hence a high rigidity.

It is however also possible for the table board to be disposed in the clearance and for one length of the table board to be smaller than a length of the clearance longitudinally of the guideways, thereby allowing this clearance to be used preferentially for disposition of the table board and advantageously allowing support facilities for the table board to be disposed in this clearance.

However, it is also advantageous if support rails for the table board are disposed in the clearance since all that is then necessary is an adjustment of the table board or the workpiece carriers to position the handling and/or processing devices relative to the chain conveyor.

According to another variation, it is provided that a guide sprocket for the chain conveyor is disposed in the chain guiding stations and a feed drive for the guide sprocket is associated with at least one of two chain guiding stations associated with the housing units, thereby also allowing the parts for chain guiding of the chain conveyor to be manufactured in greater quantities and in series production and to be interchangeable. Furthermore, only one design principle is required for the driven and the following chain guiding station.

It is also advantageous if the guide sprocket is connected to a damping and/or setting device, e.g. a threaded spindle or a spring arrangement, extending longitudinally of the chain conveyor since by these means the shocks occurring during startup of the chain conveyor are damped and it is possible to achieve continuous adjustment, as the chain conveyor becomes worn at the hinged points, by maintaining a pre-defined tension.

It is also advantageous if a spring-locking device is associated with the damping device for the guide sprocket as this allows the tensioning of the chain and the damping of shocks acting upon the chain to be advantageously combined.

It is however also possible for both guide sprockets to be coupled to a feed drive and for a damping and/or setting device and a spring-locking device to be associated with each of these feed drives since, when using two chain guiding stations which are fitted with feed drives, it is possible to feed the chain conveyor in alternate directions.

According to another embodiment, it is provided that the vertical guideway in the chain guiding station extends from the housing part disposed directly upstream thereof as far as over a drive shaft or the guide sprocket. As a result, the differing chain speeds and changes in the length of the chain conveyor arising from the polygonal effect can be compensated.

It is further possible for a distance between the vertical guideway and the axis of rotation or drive shaft in the region of the zenith of the guide sprocket to be greater than a radius of a root circle of the guide sprocket and for this distance to decrease in a peripheral direction of the guide sprocket to this radius. Owing to the design of the vertical guideway, the chain links of the chain conveyor only mesh at the end of the vertical guideway in the region of the root diameter of the guide sprocket, with the result that the chain links or workpiece carriers can be conveyed horizontally and supported without play also in the region of the vertical guideway of the housing part disposed directly upstream of the chain guiding station.

It is further advantageous if the vertical guideway in the chain guiding station comprises a guide rail part which may be positioned my means of a longitudinal setting device, e.g. clamping blocks which are displaceable on a guide column, as this makes it possible continuously to readjust the guidance of the chain links in this transition region between housing part and chain guiding station also during tensioning of the chain conveyor and in the event of changes in length during operation.

A construction is also advantageous wherein the vertical guideway in the chain guiding station comprises two guide rail parts which are telescopically displaceable relative to one another as this permits a jerk-free passage of the chain links in the adjustment region.

An embodiment is also advantageous wherein the chain conveyor is provided with track rollers, which are associated with the guideways and are spaced apart from one another at right angles to the chain longitudinal direction, and wherein one width of the guide rail parts is smaller than a width of a track roller which meshes in the guide sprocket with the result that sliding friction is avoided both in the region of the guideway and in the region of the guide sprocket.

It is however also possible for one length of a housing part to be a multiple of a width thereof, thereby allowing access to the chain conveyor and requiring only a short stroke for handling devices used, for example, to supply parts from the supply devices to the workpiece carriers.

It is further possible for one length of a housing part to correspond roughly to a length of three chain links, thereby also allowing a plurality of workstations to be disposed in tandem over the length of a housing part.

It is however also advantageous if the chain links form the workpiece carriers since it is then possible to keep the masses moved in the installation to a minimum.

According to another variation, it is provided that the support device is formed by L-shaped supports which are disposed at side surfaces of the housing parts or chain guiding station and have two legs of unequal length, of which the shorter is associated with the contact surface and the longer is associated with the housing part or chain guiding station, and that preferably in the same cross-sectional area a support is disposed on each of the opposing side faces in a mirror-inverted manner, with the result that the space required for support of the installation is kept low and ease of access to the individual parts of the installation is achieved.

It is however also advantageous if the pressure device is formed by radially resilient pressure rollers and a distance between an unstressed pressure roller and the opposing lateral guideway is smaller than a width of the chain conveyor or the workpiece carriers coupled thereto, with the result that during the entire movement of the chain conveyor between the pressure rollers and the lateral guideway play-free and jerk-free guidance of the chain conveyor is guaranteed.

It is also possible for the pressure rollers and support rollers to be disposed offset relative to one another in the feed direction of the chain conveyor, thereby excluding the possibility of the workpiece carriers or chain links being flung transversely relative to their feed direction.

According to another advantageous development, it is provided that the pressure rollers and/or the support rollers are coupled to a drive mechanism, e.g. a drive motor or a chain or belt drive, because it is then possible, even when disposing additional housing parts in an existing installation, to get by without changing the required power of the feed drive in the chain guiding station since some or all of the pressure rollers may be additionally provided with a drive mechanism. At the same time, it is thereby possible to ensure specific acceleration and deceleration values by providing the pressure rollers with their own drive in addition to the drive of the chain conveyor.

It is moreover advantageous if the feed drive is a servo drive, e.g. an electric stepping motor, because then the workpiece carriers or chain links can be positioned in the individual work areas by means of the feed drive.

Figure 6:
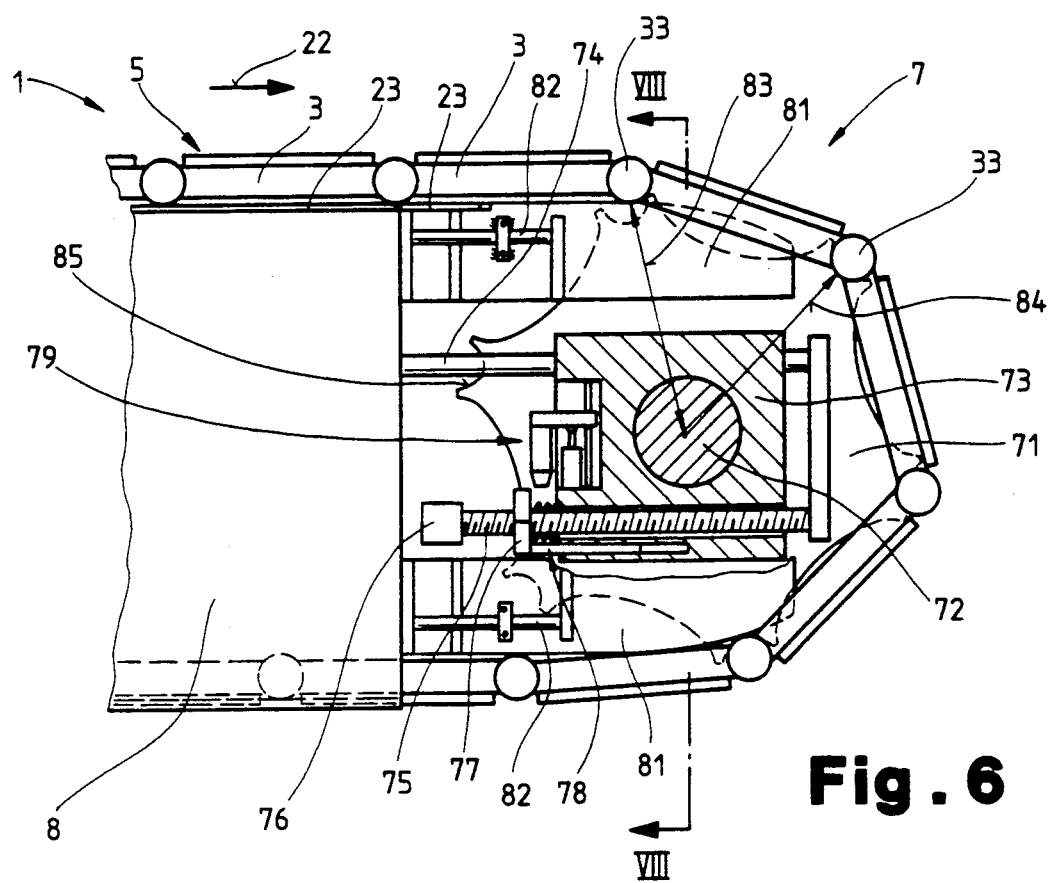
Figure 7:
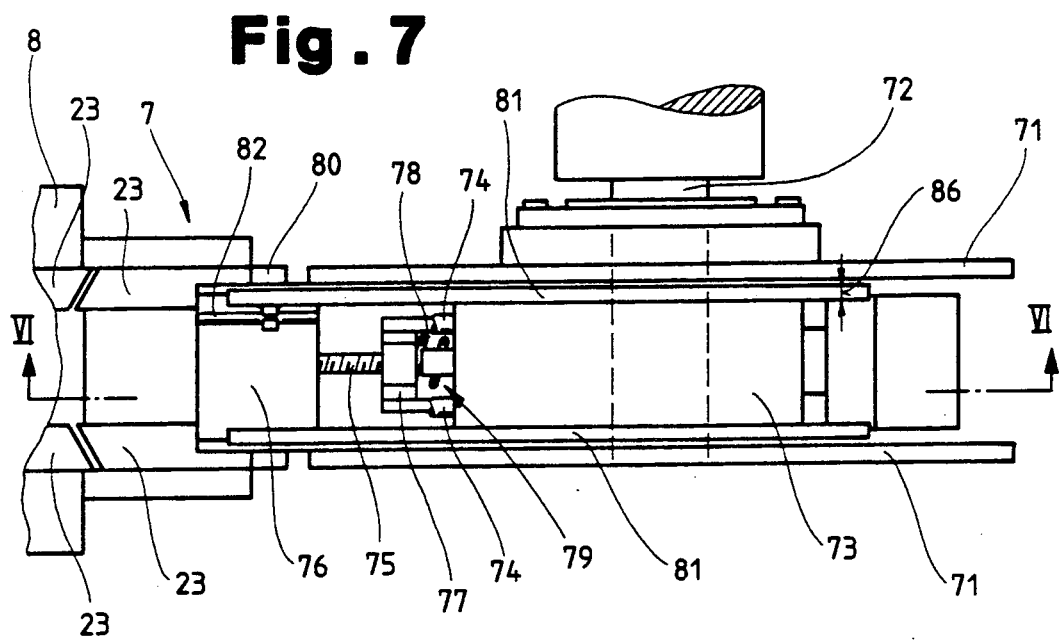

For a clearer understanding of the invention, it is described hereinafter in greater detail with reference to the embodiments illustrated in the drawings:

These show:

FIG. 1 a simplified diagrammatical side view of an installation according to the invention;

FIG. 2 a front view, in section along the lines II—II of FIG. 1, of the installation;

FIG. 3 a diagrammatical, extremely simplified view of a housing part of the installation according to the invention with the chain conveyor and the lateral and vertical guideways and the table board;

FIG. 4 a front view, in section, of the workpiece carrier of FIG. 3 with the lateral and vertical guideways of the housing part which are associated with it;

FIG. 5 a side view of a housing part as in FIGS. 1 to 3;

FIG. 6 a side view, in section along the line VI—VI of FIG. 7, of a transition region between a housing part and a chain guiding station;

FIG. 7 a plan view of the transition region between the housing part and the chain guiding station of FIG. 6;

FIG. 8 a front view, in section along the line VIII—VIII of FIG. 6, of the chain guiding station;

FIG. 9 a side view of part of a chain conveyor constructed according to the invention and comprising a chain link;

FIG. 10 a plan view of the workpiece carrier of FIG. 9.

FIG. 1 shows an installation 1 for processing and/or assembling components 2. These components 2 are disposed on workpiece carriers 3. For holding the components 2 on the workpiece carriers 3, receptacles 4 are connected to the workpiece carrier 3 or are moulded as a single piece thereon. The workpiece carriers 3 in the present embodiment form a chain conveyor 5. A feed drive 6 which is disposed in the region of a chain guiding station 7 for the chain conveyor 5 is used to advance the chain conveyor 5. Located between the two chain guiding stations 7 are a plurality of housing parts 8 which, in the illustrated embodiment, are self-supporting. These housing parts 8 have end plates 9 which face one another and may be interconnected by means of guidance and coupling devices 10 to form a self-supporting housing unit. Guideways 11, 12 extend at right angles to the end plates 9, with the drawn course of the chain conveyor 5 being conveyed in the guideway 11 and the return course being conveyed in the guideway 12. By way of the guidance and coupling devices 10 between the individual housing parts 8, the strung-together guideways 11 and 12 of the housing parts 8 form a continuous plane guidance device for the chain conveyor 5. The installation 1 formed by the housing parts 8 and the chain guiding stations 7 is supported by support devices 13 on a support surface 14.

The support devices 13 are formed by L-shaped supports which are disposed in a mirror-inverted manner relative to a vertical plane of symmetry 15 and are connected to the housing parts 8 in the region of side walls 16. To facilitate fastening of the L-shaped supports to the side walls 16, longitudinally extending assembly rails 17 forming a continuous fastening device are provided. These assembly rails 17 are formed, for example, by T-shaped grooves into which are inserted sliding blocks 18 whose sectional shape is adapted to the groove shape and which are provided, for example, with a thread of their ends facing the support devices 13, with the support devices 13 being pressed against the side walls 16 of the housing parts 8 and fixed in relation thereto by means of nuts. One advantage to be derived from use of such a continuous fastening device is that the support devices 13 may be positioned at any point along the installation 1 so as not to obstruct the arrangement of workstations or of handling or supply units associated therewith. Similarly, these continuous fastening devices may alternatively be used to fix the end positions of supply units or handling devices so that they may be utilised in numerous ways.

As FIGS. 1 and 2 show, the housing parts 8 are of uniform dimensions, having a length 19, a height 20 and a width 21. Thus, the housing parts 8 may easily be assembled in a streamlined manner and individual housing parts 8 can be interchanged without difficulty. The continuous fastening device in the form of assembly rail 17 also makes it possible, when interchanging individual housing parts 8, for the housing parts 8 which are directly adjacent to be provisionally supported by means of support devices 13 with the result that, for example, a defective housing part 8 or the workstation disposed in the region thereof can easily be replaced by a workstation of a different type.

With a suitably designed fastening device, especially with precision construction of the longitudinal alignment of this fastening device, it is also possible by inserting sliding pads in the transition region between adjacent housing parts 8 to position these two housing parts by means of this sliding pad both vertically and laterally and to fix them in position. Designing the guidance and coupling device 10 in this way would make it possible for the individual housing parts 8 to be removed and installed at right angles to a feed direction—arrow 22.

As is further shown, the support devices 13 may be fitted with feet elements which are adjustable perpendicular to the support surface 14 so that the installation may be erected horizontally irrespective of uneven areas in the region of the support surface 14.

FIG. 3 shows a housing part 8. The guideway 11 carries the drawn course of the chain conveyor 5 and comprises guide rails 23 for vertical guidance of the chain links forming the workpiece carriers 3. Lateral guideways 24, 25, which are formed by support rollers 28 and pressure rollers 29 disposed one behind the other at a distance 26 and 27 in feed direction—arrow 22, are used for lateral guidance. The support rollers 28 are associated with a side surface 30 of the workpiece carrier 3 and the pressure rollers 29 are associated with a side surface 31 lying opposite said side surface 30. The pressure rollers 29 exert a pressure force, indicated by arrow 32, upon the workpiece carriers 3 in the direction of the support rollers 28. As a result, the workpiece carriers 3 take up a precise position, which is accurate to a fraction of a millimeter, at right angles to the direction of progressive movement indicated by arrow 22. Precise vertical guidance is meantime ensured by the guide rails 23.

To permit accurate vertical and lateral guidance of the workpiece carriers 3 over an extended period of time, said workpiece carriers are supported on the guide rails 23 by means of track rollers 33. These track rollers 33 are supported on an axis serving as a chain link pin 34. The chain link pin 34 in each case connects two successive workpiece carriers 3, which form the chain links, for joint progressive movement in a direction at right angles to the guide rails 23, i.e. vertically and in feed direction—as per arrow 22—i.e. longitudinally and in the direction of conveying. Vertical guidance of the workpiece carrier 3 is therefore effected in each case by the track rollers 33 and by the track rollers 33 associated with the workpiece carrier located directly upstream, with the workpiece carrier 3 in each case being supported by the chain link pin 34 on these track rollers 33. In order to allow independent lateral positioning for each workpiece carrier 3, a width 35 of a recess 36 in the workpiece carrier 3 is greater than a width 37 of a coupling extension 38 carried on the chain link pin 34. This enables the chain links or workpiece carriers 3 directly succeeding one another to be adjusted laterally relative to one another, with the lateral adjustment of the workpiece carriers 3 then being influenced only by the position of the lateral guideway 25 and not by the position of the chain conveyor 5 as such.

As FIG. 3 further shows, the housing part 8 is constructed as a single piece and, besides the guideway 11, also has on its lower side a guideway 12 formed by guide rails 39 in which the return course of the chain conveyor 5 is conveyed by means of the track rollers 33. Vertical guide surfaces 40 in the region of said guide rails 39 are used for lateral guidance of the workpiece carriers 3. Said guide surfaces serve to prevent the workpiece carriers from pitching. The two parts accommodating the guideways 11 and 12 are interconnected by the end plates 9. Disposed in said end plate 9 are alignment pins 41 and bores 42 for screws 43 which jointly form the guidance and coupling device 10. Also shown is the continuous fastening device in the form of assembly rail 17 having a T-shaped cross-section. Instead of the alignment pins 41, it is possible to use a coupling rail 44 guided in a mirror-free manner in the assembly rail 17 for connecting the housing parts 8 on the same level. If this coupling rail 44 is provided with bores 45, adjacent housing parts 8 may then be coupled by means of the bores 45 and screws inserted therein.

A clearance 46, in which a table board 47 is disposed, is defined by the guideways 11, 12 and the end plates 9. Length 48 of the table board 47 is shorter than a length 49 of the clearance 46. Thus, it is to a limited extent possible to move the table board 47 in feed direction—arrow 22—relative to the housing part 8 and to position it. As is diagrammatically illustrated, guidance and fastening of the table board 47 may be effected by means of retaining straps 50 which are suspended in the assembly rail 17.

As FIG. 3 further shows, disposed between the guide rails 23 is an opening 51 inside which access to the workpiece carriers 3 from below is permitted. It is therefore possible to provide additional supports for the workpiece carrier 3, especially in stations where removal of the load of the track rollers 33 of the workpiece carrier 3 is required while parts are assembled, riveted or pressed in, or it is also possible to provide rotatable parts in the workpiece carrier 3 which may be set in individual stations into varying rotated position by means of drive mechanisms which act from below on the workpiece carrier 3.

FIG. 4 shows the arrangement of the chain link pin 34 and its bearing in the coupling extension 38 of the workpiece carrier 3. The chain link pin 34 is supported in the coupling extension 38 in a bearing 52, in particular in a roller or needle bearing. In a bore 53, it penetrates the side surface 30 of the workpiece carrier 3. Disposed in front of the end of the chain link pin 34 in the region of the side surface 31 is a lateral guide rail 54 which prevents the chain link pin from moving at right angles to the feed direction. This lateral guide rail 54, which may comprise for example a hardened or nitride metal strip, serves as a locating means for the support rollers 28 which are rotatable about vertical axes 55 which are in turn supported or fastened in the housing part 8. In the region of the opposite side surface 31, the chain link pin 34 is carried in a blind hole 56. Further bores 57 in the workpiece carrier 3 are constructed as a press fit for receiving and retaining the chain link pin 34. Two track rollers 33 are disposed next to one another between said bores 57 and the blind hole 56, and between the bore 57 and the bore 53. These track rollers 33 are similarly formed by roller bearings. Because of the selected construction, it is therefore easily possible to operate the chain conveyor 5 in an almost play-free manner and without wear over an extended period since guidance of the workpiece carrier 3 relative to the guide rails 23 is effected in the form of rolling friction by the track rollers 33 rolling off on the guide rails 23. Similarly, the movements between directly successive workpiece carriers 3, particularly in the region of the chain guiding station 7, are effected by means of the bearing 52 with the result that, in this region too, rolling friction but not sliding friction can occur. Naturally it is possible to use sliding bearings instead of the roller bearings shown, or on the other hand it is also possible to prevent the chain link pin 34 from twisting in the individual bearings 52 or bore 53 by means other than the bores 57 designed as a press fit.

As FIG. 4 further shows, the side surface 31 is constructed so as to extend obliquely relative to the plane of symmetry 15. The distance of this side surface 31 from the vertical plane of symmetry decreases as the distance from the guide rails 23 increases. Similarly, the pressure rollers 29 associated with the side surface 31 are designed so as to taper towards the housing part 8. The pressure rollers 29 are rotatably supported similarly by means of vertical axes 55 which are fastened in the housing part 8. As the broken lines indicate, said axes 55 of the pressure rollers 29 may also be coupled to a drive motor 58 which supports the feed movement of the feed drive 6.

To allow play-free guidance of the workpiece carriers 3 along the lateral guideway 25 formed by the support rollers 28, a distance 59 between the axes 55 of the pressure rollers 29 and the support rollers 28 is smaller than a width 60 of the workpiece carrier 3 plus a radius of the support roller 28 and a radius 61 of the radially resilient pressure roller 29. The radially resiliently deformable pressure roller 29 exerts a pressure force which extends in the direction of the arrow 32 towards the support rollers 28 and by mans of which play-free location of the workpiece carrier 3 on the support rollers 28 is achieved. At the same time, as a result of the conical design of the pressure rollers 29, a pressure force is also exerted in the direction of the guide rails 23 and results in the workpiece carrier 3 being supported in a play-free manner on said guide rails 23. The end effect is that, despite the workpiece carrier being designed as a chain link, it is possible for it to be guided in a play-free manner along the lateral guideway 25.

As FIG. 4 further shows, the assembly rail 17 allows one end of a linear conveying track 62 of a supply unit to be precisely set in its position relative to the housing part 8 with the result that, in the event of removal of parts 63, said parts may be picked up by a diagrammatically shown gripper 64 always precisely at the correct location and moved for deposit on the workpiece carrier 3.

Supporting the linear conveying track 62 in this manner by means of a supporting yoke 65 in the assembly rail 17 makes it possible to position the linear conveying track both vertically and in a direction at right angles to the direction of progressive movement and, of course, also in the direction of progressive movement.

FIG. 5 is a side view of a housing part 8 from which it may be seen that the length 19 of the housing part 8 corresponds to a multiple of a chain link length 66, in the present case three times such a chain link length 66. Naturally, it is also possible for the length 19 of the housing part to be only twice a chain link length 66. This achieves the advantageous effect that any number of housing parts 8 may be strung together because the length of the chain can always be extended by precisely three chain links or two chain links. If, on the other hand, the chain link length 66 is not a whole fraction of the length 19 of the housing part 8, then when extending the installation 1 it is necessary always to consider the required chain pitch and to compensate the resultant distance by means of a suitable adjusting path both in the drawn and in the return course of the chain in the region of the chain guiding station 7.

The table board 47 is supported in the clearance 46 on support rails 67 fastened to the end plates 9. Since the length 49 of the clearance 46 is greater than the length 48 of the table board 47, the table board 47 can be adjusted in feed direction—arrow 22—relative to the housing part 8. A handling unit 68 and, for example, a screw device 69 is fastened on this table board 47. Once the chain conveyor 5 has been assembled and tensioned, the working positions resulting from the timed feed of the workpiece carriers 3 are fixed by the chain conveyor 5. Since the position of the chain links after each feed movement is however dependent upon the span distance and several external factors of the installation 1, after the chain conveyor 5 has been completed and assembled it is necessary to adjust the handling units 68 and the screw device 69 and other operating equipment to the position of the chain links. For this it was previously necessary to position the individual handling units or screw devices and other operating equipment one by one on the table boards and move them into a position of alignment with their working position on the workpiece carrier 3. Now, however, owing to the arrangement and design of the table board 47 as shown in FIG. 5, it is possible to displace the units or devices arranged in the precise pitch dimension 70 all at once with the table board 47 in feed direction—arrow 22—or counter to the feed direction, thereby allowing an alignment with the workpiece carriers 3. Thus, by adjusting the table board 47 relative to the housing part 8, all the units and devices disposed thereon may be set at their exact working position on the workpiece carrier. This has the advantage that, when the tension of the chain is regulated or a chain link exchanged because of a defect or the like, the installation can rapidly be restored to a state of readiness for operation and precise functioning.

FIG. 6 shows the installation 1 in the transition region between a chain guiding station 7 and a directly adjacent housing part 8. The chain guiding station 7 comprises a guide sprocket 71 in the form of a chain wheel which is supported on a drive shaft 72. The drive shaft 72 is disposed in a housing 73 which is supported on guide columns 74 so as to be displaceable in feed direction—arrow 22. A threaded spindle 75 which can be set in rotation by means of a regulating motor 76 is disposed for displacement of the housing 73. The threaded spindle is displaceable by means of a travelling nut 77, which is supported in a torsion-proof manner relative to the housing 73, with a spring arrangement 78 interposed in or counter to the direction of the arrow 22. This enables the chain conveyor 5, which is formed by the workpiece carriers 3 forming the chain links, to be tensioned to an adequate extent. If the guide sprocket 71 is used merely to guide and not to drive the chain conveyor 5, then any impacts or shocks can be compensated by the spring arrangement 78. If, on the other hand, the chain conveyor 5 is driven by the drive shaft 72 and the guide sprocket 71, spring arrangement 78 may be disengaged by means of a spring-locking device 79 with the result that the chain conveyor 5 is conveyed precisely in a forward direction. In the illustrated embodiment, this spring-locking device 79 comprises a spacer block which may be introduced between the travelling nut 77 and the housing 73 and is displaceable relative to the housing 73 by means of a cylinder. In the position of rest illustrated by the solid lines, the spring arrangement 78 is functioning, while on lowering of the locking block a rigid connection is provided between the travelling nut 77 and the housing 73.

If both chain guiding stations 7 are constructed as shown in FIG. 6, the chain conveyor 5 may be moved selectively in or counter to the direction of progressive movement indicated by the arrow 22, with the spring-locking device 79 being selectively activated in the case of the chain wheel driving the chain conveyor 5 while, in the case of the non-driven guide sprocket 71, the spring-locking device is disengaged in the manner shown in FIG. 6.

FIGS. 6 and 7 further show that the guide rails 23 in the region of the chain guiding station 7 comprise a fixed guide rail portion 80 and a movable guide rail portion 81. The movable guide rail portion 81 is supported so as to be movable along guide columns 82 and may be securely clamped on said guide columns. As shown more clearly in FIG. 6, the guide rail portions 81 are curved in the direction of arrow 22 and are at a distance 83 from the drive shaft 72 and the axis of rotation of the guide sprocket 71 which is greater than a radius 84 of a root circle of the guide sprocket 71. In the region of the zenith of the guide sprocket 71 facing the guide rails 23, this distance 83 decreases to the radius 84 in a quadrant following this zenith in a clockwise direction.

The possibility of displacement along the guide columns 82 is necessary because the run-in ratios between the chain links formed by the workpiece carriers 3, in particular the track rollers 33 disposed on the chain link pin 34 and the tooth spaces 85 of the guide sprocket 71 vary as a result of the displacement of the drive shaft 72 for tensioning the chain conveyor 5. Guidance of the track rollers 33 in the region of transition to the guide sprocket 71 is therefore required in order to compensate the varying chain speeds arising from the polygonal effect. These occur primarily in installations according to the invention because of the fact that the length of the individual chain links—since these act as workpiece carriers 3—is relatively great and for spatial reasons the guide sprocket 71 cannot be constructed with a diameter large enough for it to comprise at least sixteen teeth. But it is only from a tooth number of sixteen teeth upwards that the degree of irregularity virtually no longer manifests itself.

A further advantage of the solution according to the invention lies in the fact that two track rollers 33 disposed parallel to one another are associated with each guide rail 23. In the chain guiding station 7, a width 86 of the guide rail portion 81 is therefore smaller than a width 87—FIG. 4—of a track roller 33. The second track roller 33 associated with the same guide rail 23 is associated with the guide rail portion 80 which, in the region of intersection with the guide rail portion 81, similarly has a width corresponding to the width 86. In each case, therefore, the guide sprocket 71 associated with one of the two guide rails 23 is disposed in alignment with the guide rail portion 80. The use of two track rollers 33 therefore makes it possible to compensate the varying relative speeds during running-in of the track rollers 33 in tooth spaces 85. Whereas the track roller 33 rolling on the guide rail portion 81 rolls off according to the forward movement of the chain conveyor 5, when the second track roller 33 meshes in the tooth space 85 this produces an additional relative movement dictated by an additional radial relative movement between the guide sprocket 71 and the track roller 33 or the workpiece carrier 3. If, instead of two track rollers 33 associated with each guide rail 23, there were only one, sliding friction would occur either between the tooth space and this track roller or between the guide rail portion 81 and the track roller associated therewith. This can be avoided by disposing two independently movable track rollers adjacent to one another.

FIG. 8 shows the allocation of the individual track rollers 33 to the guide rail portions 80 and 81 in the region of the chain guiding station 7.

This figure further shows that, as a result of the disposition of the track rollers 33, more details of which are given in FIGS. 9 and 10, the workpiece carriers 3 are conveyed also during the return run in the guideway 12 by means of the track rollers 33. There is consequently no sliding friction either between the workpiece carrier 3 and the guideway 12 when the workpiece carrier are conveyed back along the return course. This prevents excessive wear of these parts and makes it possible to get by with a low expenditure of energy.

A workpiece carrier 3 serving as a chain link is shown on an enlarged scale in FIGS. 9 and 10. The workpiece carrier comprises a basic element which is provided in its central region with an opening 89. This opening 89 allows the component to be processed also from the underside of the guideway 11. Bores 90 and threaded bores 91 are also disposed in the basic element 88 for accommodating a carrier plate or assembly plate used to hold and position parts for assembly or the finished component.

The lateral guide rail 54 is fastened on the side surface 30 by means of countersunk screws 92, of which one is shown. In an end region facing the workpiece carrier 3 downstream in feed direction—arrow 22, the basic element 88 has the coupling extension 38 which is penetrated by the chain link pin 34. The chain link pin 34 bearing the track rollers 33 is held in its lateral position by the lateral guide rail 54. A recess 93 is also provided in the region of one of the two track rollers 33 so that the latter projects on the side remote from the guide rail 23 over a guide shoulder 94. A side wall 95 of this guide shoulder 94 is used for lateral guidance of the workpiece carriers 3 in the return course in the region of the guideway 12, this being shown more clearly in FIGS. 4 and 8. This allows the entire region of the basic element 88 located between the side walls 95 to extend between the guide rails 39 and the guide surfaces 40 of the guideway 12 and allows any parts or components still located on its surface to drop freely downwards in the return course, this especially avoiding the risk of their becoming jammed between the guide rails or surfaces 39, 40 and the workpiece carriers 3.

The feed drive 6 may take the form of any drive arrangement. Thus, it is possible to use electric angular stepping motors or other types of stepping motors or alternatively mechanically limited drive motors. It is also possible to use suitable pneumatic or hydraulic drives with servo controls. Speed regulation may be effected in such a way that the drive is not acted upon abruptly by the full feed speed, with the speed instead rising increasingly over an acceleration curve in order then, before the end of feed, to decrease in a deceleration phase to zero. It is thereby possible to prevent any parts lying loose on the chain links or workpiece carriers 3 from being flung off.

As FIG. 10 further shows, it is possible for the pressure rollers 29 to be disposed spaced apart in feed direction—arrow 22—by twice the distance of the support rollers 28, in which case they are each located centrally between two adjacent opposing support rollers 28. It is moreover also possible for the pressure rollers 29 and the support rollers 28 to be disposed uniformly spaced apart in feed direction—arrow 22—but offset relative to one another by half their distance apart, as is shown by an additional pressure roller 29 indicated by broken lines. Another alternative is however for the pressure rollers 29 to be disposed directly opposite the support rollers 28, this being diagrammatically illustrated by pressure rollers 29 indicated by dash-dot lines. Here it may prove advantageous if the pressure rollers 29 indicated by the solid lines exert a higher pressure force towards the opposing support rollers 28 than the pressure rollers 29 indicated by the broken lines. It can thereby easily be ensured that in the workstation the workpiece carrier 3 is positioned in a three-point grip between two support rollers 28 and the pressure roller 29 disposed centrally therebetween. The pressure rollers 29 indicated by the broken lines then only prevent pitching of the workpiece carriers 3 or canting of the chain conveyor 5 during forward movement of the chain.

For adjustment of the chain conveyor and resetting of the feed drive, the housing 73 is penetrated by a bore which extends parallel to the drive shaft 72 and into which a centering pin 96 can be inserted when bores disposed in the guide sprocket 71 are in a corresponding position. After insertion of the centering pin 96, by means of which an exact position of the chain relative to the guide sprocket 71 or the housing part 8 is fixed, it is possible, for example, for a rotary transducer for an angular stepping motor to be set to zero so that the workpiece carriers 3 are halted by the feed movement in the subsequent cycle operation always at the exact same point along the housing parts 8.

It is also possible for the lateral guideways 24 and 25 to be formed by guide rails which cooperate with guide rollers disposed in the workpiece carrier 3 It is then possible, for example, to preload the stop rail forming the lateral guideway 24 under spring initial tension in the direction of the lateral guideway 25 with the result that, in this case too, play-free guidance of the workpiece carriers 3 along the lateral guideway 25 can be achieved On the other hand, it is also possible t make the guide rollers disposed between the guide rail of the lateral guideway 24 and the workpiece carrier 3 from a radially resilient material so that the clamping force in the direction of the lateral guideway 25 is provided by these rollers.

Naturally, it is also possible for the damping device to be formed by rubber spring blocks, pneumatic springs or means other than a helical spring. The setting device may also be formed by pneumatic or hydraulic drive mechanisms, in which case the damping device may also be incorporated in these.

I claim:

1. An installation for processing and/or assembling components, which comprises
   (a) a housing unit including
      (1) a plurality of adjacent housing parts of identical construction,
      (2) chain conveyor guiding stations at respective ends of the housing unit and
      (3) coupling devices for interconnecting the housing parts and guiding stations in alignment with each other,
   (b) support devices for supporting the housing unit on a support surface,
   (c) a driven chain conveyor comprised of workpiece carriers forming chain links of the chain conveyor, each workpiece carrier being equipped with receptacles for the components, and
   (d) a guidance device for the chain conveyor, the guidance device comprising
      (1) guide rails for the chain conveyor, the guide rails extending parallel to an upper side of the housing parts along the housing unit for vertically guiding the workpiece carriers, and
      (2) guideways extending parallel to the guide rails on the upper side of the housing parts for laterally guiding the workpiece carriers, the guideways comprising rollers spaced apart from one another along the guideways, the rollers being supported for rotation on axes extending substantially perpendicularly to the upper sides of the housing parts.

2. The installation of claim 1, wherein the guide rails on the upper side of the housing parts vertically guide the workpiece carriers in an upper course of the chain conveyor, and further comprising guide rails at a lower side of the housing parts for vertically guiding the workpiece carriers in a lower course of the chain conveyor, the guiding stations guiding the chain conveyor between the upper and lower chain courses.

3. The installation of claim 1, wherein the housing parts and guiding stations have facing end plates, and the coupling devices interconnect the end plates.

4. The installation of claim 1, wherein the rollers at one longitudinal side of the chain conveyor are rigid while the rollers at an opposite longitudinal side of the chain conveyor exert a pressure on the workpiece carriers to press the workpiece carriers against the rigid rollers.

5. The installation of claim 4, wherein the rollers at the opposite longitudinal side of the chain conveyor are radially resilient pressure rollers, the distance between the unstressed pressure rollers and the opposite rigid rollers being smaller than the width of the workpiece carriers.

6. The installation of claim 4, wherein the rigid and pressure rollers are offset from each other in the longitudinal direction of the chain conveyor.

7. The installation of claim 1, further comprising a table board displaceably supported on each housing part for supporting processing and assemblying devices.

8. The installation of claim 7, wherein the guide rails on the upper side of the housing parts vertically guide the workpiece carriers in an upper course of the chain conveyor, and further comprising guide rails at a lower side of the housing parts for vertically guiding the workpiece carriers in a lower course of the chain conveyor, the guiding stations guiding the chain conveyor between the upper and lower chain courses, the housing defining a clearance between the upper and lower guide rails, the table board being mounted in said clearance and having a length extending in the direction of the guidance device which is smaller than the length of the clearance in said direction.

9. The installation of claim 8, further comprising support rails for the table board for displaceably mounting the table board in said clearance.

10. The installation of claim 1, comprising a guide sprocket for the chain conveyor disposed in each chain conveyor guiding station, and a feed drive for the chain conveyor connected to the guide sprocket in at least one of the guiding stations for driving the chain conveyor.

11. The installation of claim 10, further comprising a damping device connected to the guide sprocket, the damping device including a spring extending in the longitudinal direction of the chain conveyor.

12. The installation of claim 11, further comprising a spring-locking device associated with the spring.

13. The installation of claim 10, further comprising a setting device connected to the guide sprocket, the setting device including a threaded spindle extending in the longitudinal direction of the chain conveyor.

14. The installation of claim 1, wherein each housing part has a length corresponding to a multiple of the length of the workpiece carriers.

15. The installation of claim 1, wherein the support devices are L-shaped supports disposed at side surfaces of the housing parts, the support having a shorter leg adjacent the support surface and a longer leg adjacent the side surfaces of the housing parts.

16. The installation of claim 15, wherein the L-shaped supports are disposed in a mirror-inverted manner at opposite ones of the side surfaces in a common plane extending transversely to the conveyor chain.

17. The installation of claim 1, wherein the housing parts have mounting rails at side surfaces thereof and the supporting devices are fastened on the mounting rails.

18. An installation for processing and/or assembling components, which comprises
 (a) a housing unit including
  (1) a plurality of adjacent housing parts of identical construction,
  (2) downstream and upstream chain conveyor guiding stations at respective ends of the housing unit, a guide sprocket being disposed in each guiding station and having an axis of rotation, and
  (3) coupling devices for interconnecting the housing parts and guiding stations in alignment with each other,
 (b) support devices for supporting the housing unit on a support surface,
 (c) a driven chain conveyor trained over the guide sprockets and comprised of workpiece carriers forming chain links of the chain conveyor, each workpiece carrier being equipped with receptacles for the components, and
 (d) a guidance device for the chain conveyor, the guidance device comprising
  (1) guide rails for the chain conveyor, the guide rails extending parallel to an upper side of the housing parts along the housing unit and having portions extending from a respective housing part adjacent the guiding station at each end into the guiding station substantially as far as the axis of the guide sprocket for vertically guiding the workpiece carriers, the guide sprocket defining a root circle of revolution and having a zenith, and the guide rails in the guiding station being spaced at the zenith a distance from the guide sprocket axis which is greater than the radius of the root circle and said distance decreasing in a peripheral direction of the guide sprocket to the radius of the root circle.

19. The installation of claim 18, wherein the guide rail portions are repositionable, and further comprising a longitudinal repositioning device displaceably mounted on a guide column in the guiding station.

20. The installation of claim 19, wherein the guide rail portions are comprised of two sections which are telescopically displaceable relative to each other.

21. The installation of claim 18, further comprising spaced apart track rollers supporting the conveyor chain on the guide rails, the track rollers meshing with the sprocket guides and having a width which is smaller than the width of the guide rail portions.

* * * * *